Nov. 18, 1952        C. E. ROSE        2,618,089

AUTOMOBILE LICENSE PLATE HOLDER

Filed Sept. 17, 1949

INVENTOR.
CHARLES E. ROSE
BY
Edward M. Apple
ATTORNEY

Patented Nov. 18, 1952

2,618,089

UNITED STATES PATENT OFFICE 2,618,089

AUTOMOBILE LICENSE PLATE HOLDER

Charles E. Rose, Detroit, Mich.

Application September 17, 1949, Serial No. 116,237

6 Claims. (Cl. 40—130)

This invention relates to automobile accessories and has particular reference to an automobile license plate holder.

An object of the invention is to provide a combined license plate and name plate holder for an automobile with a tubular illuminating element built therein, whereby to provide an even and highly effective distribution of light to the license plate and name plate.

Another object of the invention is to provide a license plate holder which is transparent and which is constructed and arranged to provide a protective guard and a weather- and dust-proof housing for a tubular illuminating element carried therein.

Another object of the invention is to generally improve devices of the character indicated and to provide such a device which is simple in construction, economical to manufacture, and easy to install.

Another object of the invention is to provide an illuminated license plate holder with means for interchanging thereon name plates or advertising mediums.

The foregoing and other objects and advantages of the invention will become more apparent as the description proceeds, reference being made from time to time to the accompanying drawings forming part of the within disclosure, in which drawings.

Figure 3:
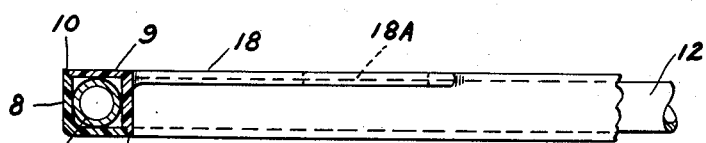
Fig. 3 is a section taken substantially on the line 3—3 of Fig. 1.

Referring now more particularly to the drawings, it will be understood that in the embodiment here disclosed, the reference character 7 indicates generally the license plate holder, which is formed of two rectangular sections 8 and 9 (Fig. 3) of transparent plastic material, each of which is substantially L-shaped in cross section and which sections are arranged, as shown in Fig. 3, to form a rectangular tube having a substantially square cross section. The abutting edges 10 and 11 of the sections 8 and 9 are preferably secured to one another by means of a plastic cement or other suitable material, to form water-tight and dust-proof seals.

Figure 1:
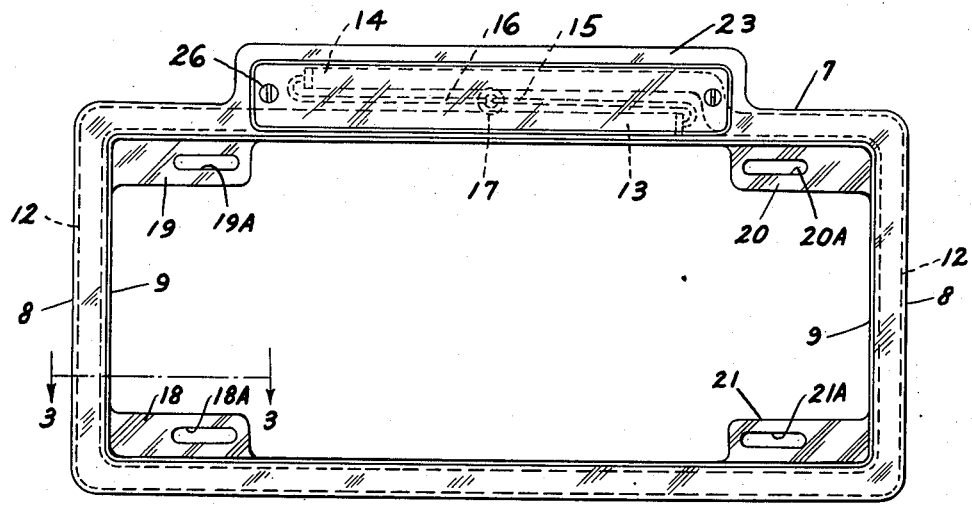
Fig. 1 is a front elevational view of a license plate holder embodying the invention.
Figure 2:
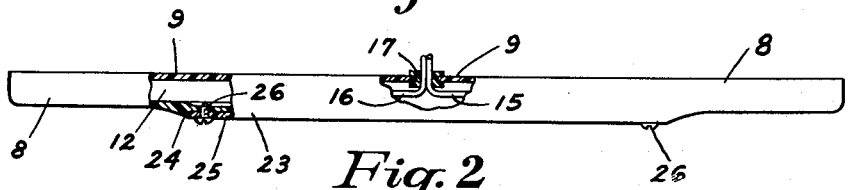
Fig. 2 is a side view of the device shown in Fig. 1, with parts broken away.

A neon tube 12 is mounted in the rectangular frame with its sides in closely abutting relation with the inside faces of the sections 8 and 9. This serves to protect the neon tube 12 against breakage. The ends 13 and 14 of the neon tube 12 overlap, as shown in Fig. 1 to provide ample illumination for the widened area of section 8 and the name plate hereinafter described. The respective ends 13 and 14 of the neon tube 12 are provided with electrical leads 15 and 16 which extend through an aperture formed in the rear of the section 9, and are insulated by means of a rubber grommet 17.

At each inside corner of the section 9 is formed a lug, which lugs are numbered 18, 19, 20, and 21, and which said lugs are provided with longitudinal slots 18A, 19A, 20A, and 21A, whereby the frame 7 may be attached to the license plate brackets provided on a conventional automobile. Ample space is provided on the lugs for drilling additional holes if the slots 18A to 21A do not align with the openings provided in the automobile license plate brackets.

The front section 8 of the frame 7 is provided at the top with a widened area 23, which is undercut, as at 24, to provide clearance for the insertion of a name plate 25, which is adapted to carry the name of an automobile dealer or the name of the owner or other advertising media. The name plate 25 is secured to the section 8 by means of screws 26 or other suitable means. The name plate 25 is also preferably formed of a transparent plastic material. The name plate 25 covers the overlapping ends of the tube and its removal affords ready access to the electrical leads to the tube.

It is within the contemplation of the invention to make the sections 8 and 9 of the frame of different colored materials, so as to effect different visual results in the illumination of the license plate. For example, section 8 may be made of a red plastic, and section 9 may be made of a clear plastic so that a clear white light is directed to the license plate (not shown), and a red light, which serves as a tail light, is directed to the rear of the automobile.

From the foregoing, it will be seen that I have disclosed a novel self-contained and self-illuminated license plate holder, with illuminated means thereon for carrying advertising media.

Having described my invention what I claim and desire to secure by Letters Patent is:

1. An automobile license plate holder comprising a pair of transparent plastic rectangular members, the walls of each being L-shaped in cross section throughout substantially their entire length, said members being positioned edge to edge to form a hollow enclosure for the accommodation of a tubular light, a tubular light housed in said enclosure and supported by the side walls thereof and inside corner elements on one of said members having slots therein for accommodating fastening elements.

2. The structure of claim 1, in which one of said rectangular members is formed with an integral, outwardly extending hollow rectangular portion arranged to accommodate the return ends of said tube.

3. The structure defined in claim 1, in which the top and bottom walls and the side walls of said enclosure are the same size.

4. The structure defined in claim 1, in which the top and bottom walls and the side walls of said enclosure are of the same size, and said tubular light is supported throughout substantially its entire length by the four walls of said enclosure.

5. The structure defined in claim 1, in which the contacting edges of said rectangular members are stepped throughout their length, there being a plastic cement in said stepped portions for moisture proofing the interior of said enclosure member.

6. The structure of claim 1, in which the individual members comprising the pair of transparent plastic members are of different colors.

CHARLES E. ROSE.

REFERENCES CITED

The following references are of record in the file of this patent:

UNITED STATES PATENTS

| Number | Name | Date |
|---|---|---|
| D. 163,320 | Porrett | May 15, 1951 |
| 1,536,414 | Watts | May 5, 1925 |
| 1,660,575 | Overton | Feb. 28, 1928 |
| 1,739,709 | Chiapetto | Dec. 17, 1929 |
| 1,760,253 | Parrish | May 27, 1930 |
| 1,877,075 | Stephenson | Sept. 13, 1932 |
| 2,093,620 | Roessler | Sept. 21, 1937 |
| 2,212,642 | Jackson | Aug. 27, 1940 |
| 2,271,456 | Hendricks | Jan. 27, 1942 |
| 2,499,747 | Griffith | Mar. 7, 1950 |
| 2,532,776 | Linser | Dec. 5, 1950 |